United States Patent
Yi et al.

(10) Patent No.: US 8,049,829 B2
(45) Date of Patent: *Nov. 1, 2011

(54) STRUCUTURE OF LCD PANEL AND METHOD OF MANUFACTURING THE SAME

(75) Inventors: Hung Meng Yi, Tao Yuan Shien (TW); Tsai Chu Hung, Tao Yuan Shien (TW)

(73) Assignee: AU Optronics Corp., Hsin-chu (TW)

(*) Notice: Subject to any disclaimer, the term of this patent is extended or adjusted under 35 U.S.C. 154(b) by 1027 days.

This patent is subject to a terminal disclaimer.

(21) Appl. No.: 11/797,703

(22) Filed: May 7, 2007

(65) Prior Publication Data

US 2007/0268423 A1 Nov. 22, 2007

Related U.S. Application Data

(62) Division of application No. 10/961,156, filed on Oct. 12, 2004, now Pat. No. 7,224,415.

(30) Foreign Application Priority Data

Apr. 9, 2004 (TW) ................. 93110019 A

(51) Int. Cl.
*G02F 1/136* (2006.01)
*G02F 1/1335* (2006.01)

(52) U.S. Cl. .................... 349/44; 349/111

(58) Field of Classification Search .......... 349/110, 349/111, 44, 54, 55, 38
See application file for complete search history.

(56) References Cited

U.S. PATENT DOCUMENTS

| 6,476,882 B1 | 11/2002 | Sakurai |
| 6,958,802 B2 * | 10/2005 | Watamura .............. 349/192 |
| 2005/0078234 A1 | 4/2005 | Jeong et al. |

FOREIGN PATENT DOCUMENTS

| JP | 2-254419 A | 10/1990 |
| JP | 10-104664 A | 4/1998 |
| JP | 2004-54069 A | 2/2004 |

* cited by examiner

*Primary Examiner* — James Dudek
(74) *Attorney, Agent, or Firm* — Thomas, Kayden, Horstemeyer & Risley, LLP

(57) ABSTRACT

Pixel electrodes in a liquid crystal panel extend to cover the entire pixel regions. The light leakage is generated only on two sides of the pixel region due to the uncontinuous alignment of liquid crystal molecules when the liquid crystal panel is driven by dot inversion. Therefore, in the present invention, light-shielding layer is formed on only the corresponding region of the TFT substrate. The aperture ratio of the liquid crystal panel according to the present invention can increase and the light-shielding layer can be employed to repair the gate lines and data lines.

10 Claims, 5 Drawing Sheets

US 8,049,829 B2

STRUCUTURE OF LCD PANEL AND METHOD OF MANUFACTURING THE SAME

CROSS REFERENCE TO RELATED APPLICATIONS

This application is a divisional application of U.S. patent application Ser. No. 10/961,156, filed Oct. 12, 2004, now U.S. Pat. No. 7,224,415 the entire contents of which are hereby incorporated herein by reference in its entirety.

BACKGROUND OF THE INVENTION

1. Field of the Invention

This invention relates to a liquid crystal display (LCD) panel structure and method for manufacturing the same, and more particularly to an LCD panel structure driven by dot inversion and method for manufacturing the same.

2. Description of the Prior Art

FIGS. 1A and FIG. 1B show a conventional LCD panel, which comprises a color filter (CF) substrate 160, a thin film transistor (TFT) substrate 170, and a liquid crystal layer 150 injected in between the CF substrate 160 and the TFT substrate 170. A plurality of thin film transistors (TFTs) 105, gate lines 110, data lines 120, and pixel electrodes 140 are formed on the TFT substrate 170. A black matrix 164 and a plurality of color filters 162 are formed on the CF substrate 160. Each of the TFTs 105 mainly comprises a gate electrode 112, a gate insulating layer (not shown), a semiconductor layer 114, a source electrode 116, a drain electrode 118. The gate electrode 112 is electrically connected with a corresponding gate line 110; the source electrode 116 is electrically connected with a corresponding data line 120; and the drain electrode 118 is electrically connected with a corresponding pixel electrode 140. The alignment of liquid crystal molecules on the pixel electrode 140 is controlled by a voltage of the pixel electrode 140 applied through the TFT 105. However, the pixel electrode 140 of the conventional LCD panel is not covered the entire area surrounded with the data lines 120 and the gate lines 110. As shown in FIG. 1A, the pixel electrode 140 and the gate line 110, and the pixel electrode 140 and the data line 120 are spaced with a gap. Namely, the gate line 110 and the data line 120 are not covered by the pixel electrode 140. Hence, the alignment of the liquid crystal molecules on the gap can not be controlled by the pixel electrode 140, and a problem of light leakage will be generated in the gap.

In order to avoid the problem of light leakage, the opaque black matrix is formed on partial area of the CF substrate 160 corresponding to the gap. FIG. 1B is a cross-section schematic diagram along the line 1B-1B' in FIG. 1A. An insulating layer 172 is formed on the TFT substrate 170, the data lines 120 and the pixel electrodes 140 are formed on the insulating layer 172, and a passivation layer 104 is covered on the data lines 120 and the pixel electrodes 140 to protect them. The black matrix 164 and the color filters 162 are formed on the lower surface of the CF substrate 160, the position of the black matrix 164 is corresponding to the area of light leakage, and the position of the color filters 162 are corresponding to the area of the pixel electrodes 140.

The structure of LCD panel mentioned above overcomes the problem of light leakage by using light-shielding structure of the black matrix 164. However, the assembly precision for combining the CF substrate 160 and TFT substrate 170 of LCD panel is not good. Consequently, the dimension of the black matrix 164 must be very larger than the dimension of the gap between the pixel electrodes 140 and the gate lines 110 and between the pixel electrodes 140 and the data lines 120 for defeating the assembly imprecision resulted in the light leakage. Nevertheless, the larger black matrix 164 will reduce an aperture ratio of the LCD panel. Therefore, U.S. Pat. No. 6,476,882 discloses the light-shielding structure formed on the TFT substrate 170. FIG. 1C shows a TFT substrate structure of a LCD panel of U.S. Pat. No. 6,476,882. In the present invention, the definition for source/drain of TFT is according to the common definition, and is different from the definition in the specification of the patent mentioned above. In such structure of LCD panel, an opaque light-shielding layer 125 is formed on the TFT substrate. In order to provide a more clear description for shapes and relationships of elements, the portions of the light-shielding layer 125 covered by the pixel electrode 140, the data line 120 and the protruding structure 122 is drawn with dot-line. Because the photolithography process is more accurate than the assembly process for the LCD panel, the dimension of the light-shielding layer 125 is smaller than the black matrix 164 shown in FIG. 1B. Hence, the aperture ratio can be increased by replacing the black matrix with the light-shielding layer mentioned above. Furthermore, the light-shielding layer has a repairing function of connecting the light-shielding layer with the protruding structure while the data line is broken.

Unfortunately, in the LCD panel mentioned above, gaps between the pixel electrode and the gate lines, and between the pixel electrode and the data lines are existing in each pixel region defined by two adjacent data lines and two adjacent gate lines. Hence, whether the light-shielding structure is the black matrix on the CF substrate or the opaque light-shielding structure on the TFT substrate, the light-shielding structure must be formed on the four sides of the pixel regions. The aperture ratio is still affected, and the quality of the LCD panel can not rise.

SUMMARY OF THE INVENTION

In those conventional arts, the structure of LCD panel has those problems and drawbacks. One of objectives of the present invention is to provide a structure of LCD panel having a high aperture ratio for raising the quality of LCD panel.

Another objective of present invention is to avoid the problem of assembly imprecision by forming an opaque light-shielding layer on the TFT substrate, so the aperture ratio of the LCD panel can be further raised.

A further objective of present invention is to repair the broken data lines or gate lines with the corresponding light-shielding layer, so the product yield can be increased.

As aforementioned, the present invention provides a structure of LCD panel driven by dot inversion. The structure of LCD panel comprises an upper substrate, a lower substrate, a liquid crystal layer, a plurality of gate lines, a plurality of data lines, a pixel electrode layer, a plurality of thin film transistors, and a plurality of first opaque structures. The lower substrate is parallel to the upper substrate. The liquid crystal layer is between the upper substrate and the lower substrate. The color filter layer is on a lower surface of the upper substrate. The plurality of gate lines is on an upper surface of the lower substrate. The plurality of data lines is on the upper surface of the lower substrate and perpendicular to the plurality of gate lines, and two of adjacent gate lines and two of adjacent data lines define a pixel region. The pixel electrode layer is on the upper surface of the lower substrate, and the pixel electrode layer comprises a plurality of pixel electrodes that each pixel electrode is in a corresponding pixel region and a portion of the pixel electrode overlaps the data lines and the gate lines which define the pixel region. The plurality of thin film transistors is on the upper surface of the lower substrate, and each thin film transistor, which comprises a gate electrode, a drain electrode, and a source electrode, is in a corresponding pixel region or on a corresponding gate line. The gate electrode is electrically connected with a corresponding gate line, the source electrode is electrically connected with a corresponding data line, and the drain electrode is electrically connected with a corresponding pixel electrode. The plurality of first opaque structures and a plurality of second opaque structures are on the upper surface of the lower substrate for shielding a light leakage area of the LCD panel, the plurality of first opaque structures is parallel to the plurality of gate lines, and the plurality of second opaque structures is parallel to the plurality of data lines. In such case, each first opaque structure is on one side of a gate line of a corresponding pixel region, and each second opaque structure is on one side of a data line of a corresponding pixel region.

The present invention also provides a TFT substrate of a LCD panel. The TFT substrate comprises a substrate, and a plurality of pixel units on the substrate. Each pixel unit comprises four lines, a pixel electrode layer, a thin film transistor, and a first light-shielding layer. The four lines are on four sides of the pixel unit, and the four lines comprise a first gate line, a second gate line, a first data line, and a second data line. The first gate line and the second gate line are on two opposite sides of the pixel unit and parallel to each other, and the first data line and the second data line are on other two opposite sides of the pixel unit and perpendicular to the first gate line and the second gate line. The pixel electrode layer is in the pixel unit and the pixel electrode layer overlaps at least one of the four lines. The thin film transistor is in the pixel unit. The first light-shielding layer is in the pixel unit and near a first side of four sides of the pixel unit.

The present invention further provides a repairing method for an LCD panel. The LCD panel comprises a plurality of first light-shielding lines and a plurality of pixel electrodes that overlaps two gate lines and two data lines of a corresponding pixel region, and each first light-shielding lines is parallel to and overlaps a line of the gate lines and the data lines on a corresponding pixel region. The method mentioned above comprises the step of irradiating with a laser at least one of the first light-shielding lines to electrically connect the first light-shielding line with the line via at least two connecting points.

DESCRIPTION OF THE PREFERRED EMBODIMENT

Some sample embodiments of the invention will now be described in greater detail. Nevertheless, it should be recognized that present invention can be practiced in a wide range of other embodiments besides those explicitly described, and the scope of the present invention is expressly not limited expect as specified in the accompanying claims.

Then, the components of the different elements are not shown to scale. Some dimensions of the related components are exaggerated and meaningless portions are not drawn to provide a more clear description and comprehension of the present invention.

Figure 1A:
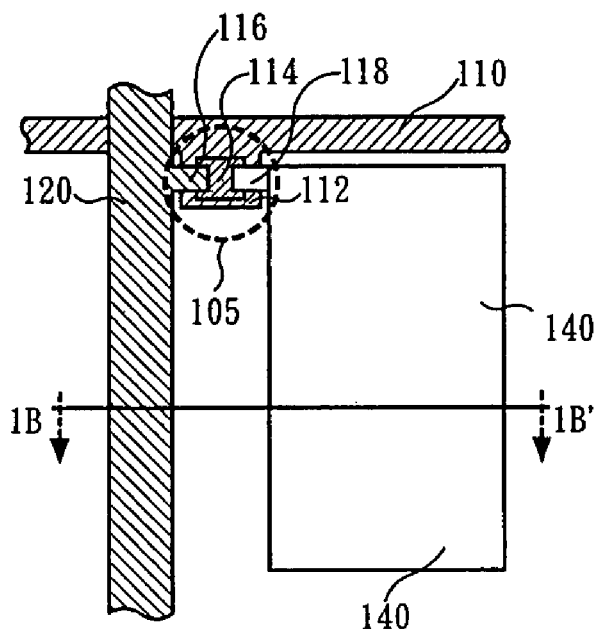
FIG. 1A is a schematic diagram of a structure of LCD panel in the conventional arts.
Figure 1B:
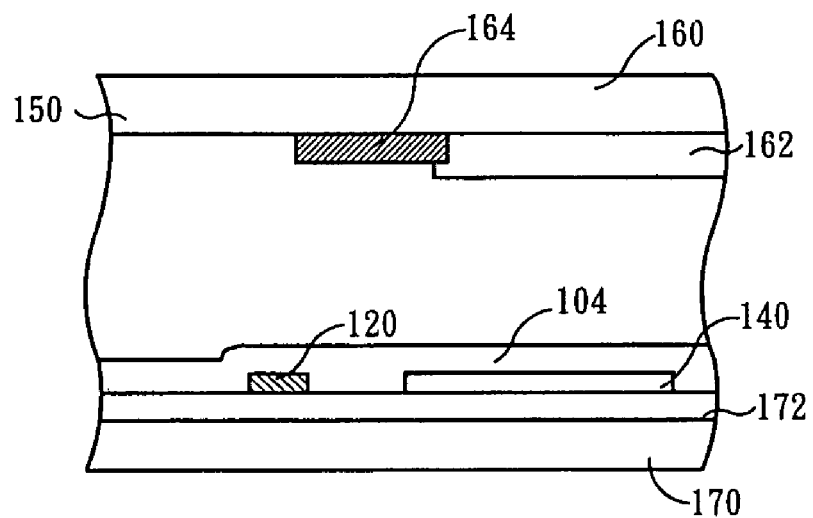
FIG. 1B is a cross-section diagram along a line 1B-1B' in FIG. 1A.
Figure 1C:
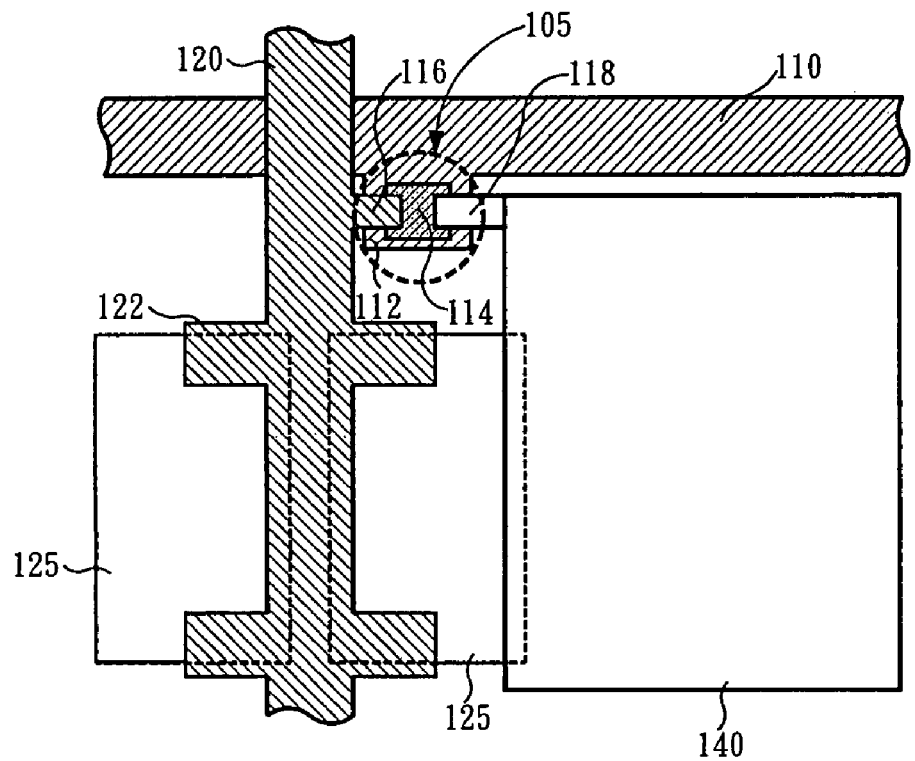
FIG. 1C is a schematic diagram of an TFT substrate having a light-shielding layer in the conventional arts.
Figure 2A:
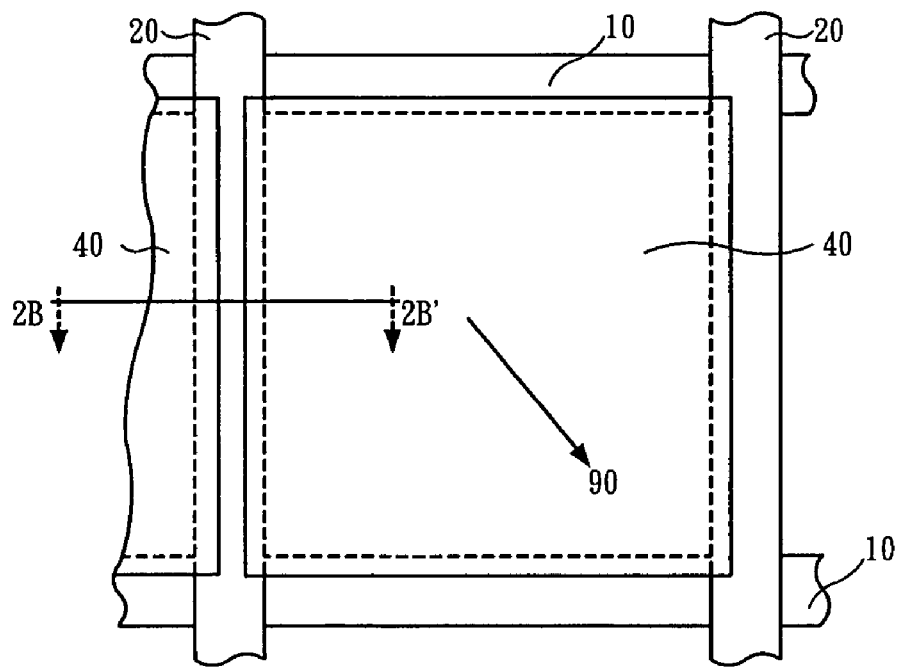
FIG. 2A is a schematic diagram of a structure of LCD panel with a high aperture ratio.

In order to increase the aperture ratio of LCD panel, the LCD panel of the present invention has pixel electrodes partially overlapping gate or data lines on a corresponding pixel region. As shown in FIG. 2A, each pixel electrode 40 partially overlap two gate lines 10 and two data lines 20 that are on the four side of a pixel region. The data line 20, and the pixel electrode 40, the covered areas of the gate line 10, the data line 20, and the pixel electrode 40 are drawn by dotted line for providing a more clear space relationship among the gate line 10, and only some pixel electrodes are drawn for providing a more concise description. Alignment of the liquid crystal molecules (not shown in FIG. 2A) in the LCD panel is parallel to an orientation direction 90. Electric lines of force are generated between the pixel electrodes and the common electrodes on the CF substrate while a voltage is applied to the pixel electrode, and the alignment direction of the liquid crystal molecules is changed to be parallel to the electric lines of force. Thus the controllable region of the alignment of the liquid crystal molecules comprises the entire pixel region, and the LCD panel of the present invention has a higher aperture ratio compared with the LCD panel in conventional arts.

For avoiding the flickering resulted from that the LCD panel needs to be driven periodically with alternating voltage, the most LCD panels are divided into a plurality of domains and the polarities of the voltage applied to two adjacent domains are opposite (e.g., dot inversion). Therefore, human eyes can feel a flicker-free image with an averaged brightness at any time. The present invention is suitable for the LCD panel driven by the method of domain inversion mentioned above, especially for the LCD panel driven by dot inversion. The present invention will be described below with embodiments of an LCD panel driven by dot inversion.

Figure 2B:
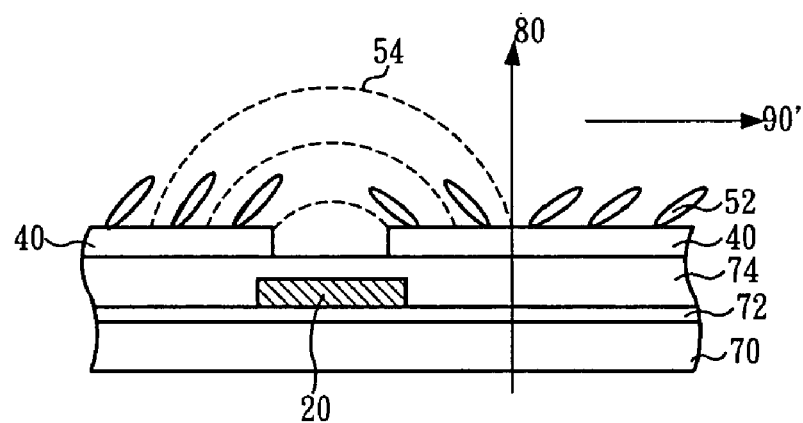
FIG. 2B is a cross-section diagram along a line 2B-2B' in FIG. 2A.

FIG. 2B is a cross-section diagram along a line 2B-2B' in FIG. 2A. As shown in FIG. 2B, in the LCD panel driven by dot inversion, each of two adjacent pixel electrodes 40 has the reverse polarities of voltage and electric lines of force 54 are generated between the two adjacent pixel electrodes 40. An insulating layer 72 is formed on a lower substrate 70, called "TFT substrate" in some prior arts. A plurality of data lines 20 is formed on the insulating layer 72 and covered with a passivation layer 74, and a plurality of pixel electrodes 40 is formed on the passivation layer 74. Due to the pre-tilted orientation of the LCD panel, the liquid crystal molecules 52 are arranged along the orientation direction 90. A component 90' of orientation direction 90 is the component along the line 2B-2B'. Hence, in FIG. 2B, on the area of the two pixel electrodes 40 having stronger electric lines of force 54, the liquid crystal molecules 52 are arranged particularly by the electric lines of force 54, toward the opposite direction of the pre-tilted orientation. The alignment direction of the liquid crystal molecules 52 on the area of stronger electric lines of force 54 is changed. Contrariwise, on the area of weaker electric lines of force 54, the liquid crystal molecules 52 are still arranged by the structure of the pre-tilted orientation, along the orientation direction. Thus the alignment direction of the liquid crystal molecules 52 is not uncontinuous. It is obvious that the light easily passes through in the border between the different alignment directions without the control of the liquid crystal molecules 52. Therefore, the light of a back light module 80 transmits through the lower substrate 70 and passes through the border with uncontinuous alignment of liquid crystal molecules to result in the light leakage of domain.

Figure 2C:
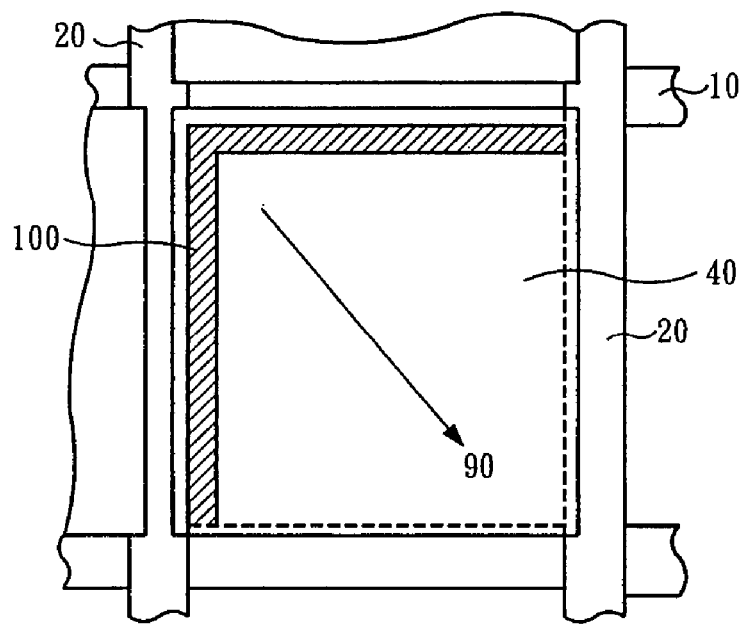
FIG. 2C is a schematic diagram of light leakage area of the structure of LCD panel in FIG. 2A.

FIG. 2C is a schematic diagram of light leakage area 100 of the structure of LCD panel driven by dot inversion. Similarly, only some pixel electrodes 40 are drawn in FIG. 2C for providing a more concise description. Obviously, the light leakage area 100 is only on two sides of four sides of a pixel region defined by two adjacent gate lines and two adjacent data lines. Hence, as shown in FIG. 2D (not showing the TFTs near the intersection of a data line and a gate line), opaque light-shielding layers 15 and 25 are formed to cover only the light leakage area 100 of each pixel region, and the problem of light leakage can be overcame to increase the contrast of the LCD panel.

Figure 2D:
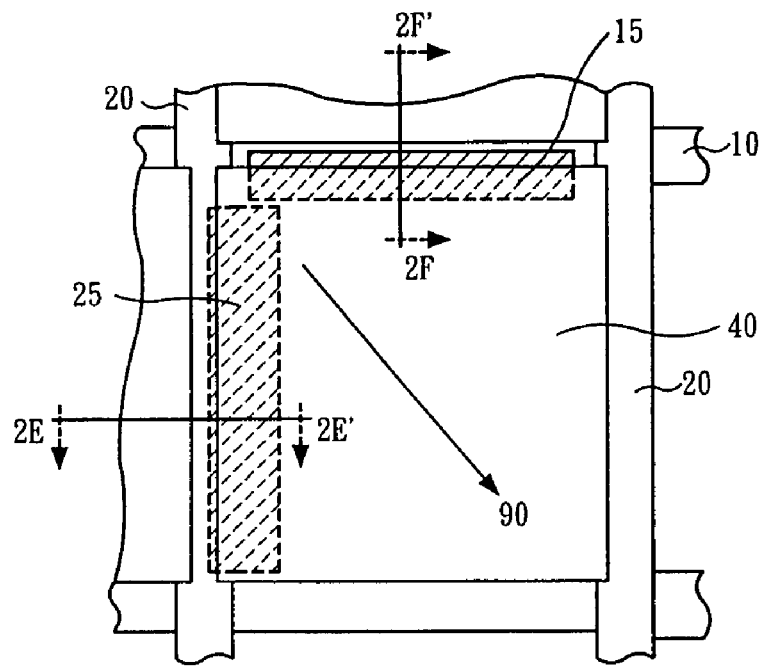
FIG. 2D is a schematic diagram of a structure of LCD panel in a preferred embodiment according to the present invention.
Figure 2E:
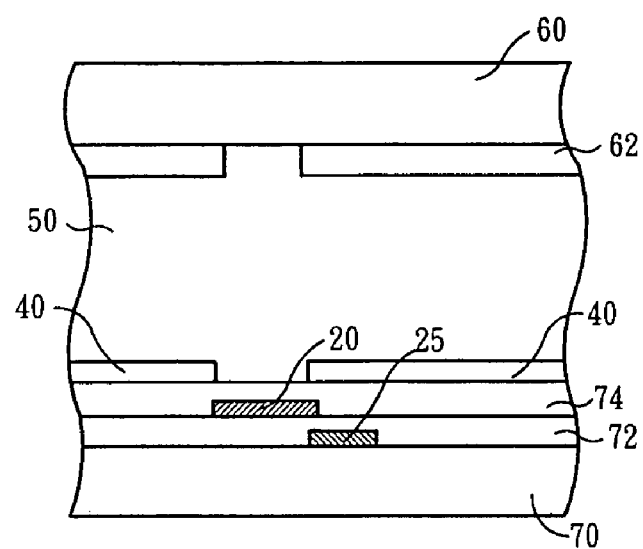
FIG. 2E is a cross-section diagram along a line 2E-2E' in FIG. 2D.

FIG. 2E is a cross-section diagram along a line 2E-2E' in FIG. 2D. The structure of LCD panel is mainly composed of an upper substrate 60 (called "CF substrate" in some prior arts), an lower substrate 70 parallel to the upper substrate 60, and a liquid crystal layer 50 between the two substrate mentioned above. The upper substrate 60 has a color filter layer 62 formed thereon. The lower substrate 70 has a plurality of data lines 20 and a plurality of gate lines 10 (shown in FIG. 2F), a plurality of pixel electrodes 40, a plurality of light-shielding layers 25, a insulating layer 72, a passivation layer 74, and a plurality of thin film transistors (not shown) formed thereon. Each pixel electrodes 40 partially overlap the data lines 20. Each light-shielding layer 25 is formed on the lower substrate 70 and covered with the insulating layer 72. The position of the light-shielding layer 25 is on the side of a corresponding data line 20 and corresponding to the border with uncontinuous alignment of liquid crystal molecules for shielding the light leakage area 100 near the data line 20. Furthermore, the light-shielding layer 25 partially overlaps the data line 20. The light-shielding, layer 25 can be formed after or before (i.e., above or below) the data line 20. It is preferable that the light-shielding layer 25 is formed before (i.e., below) the data line 20, and thus the light-shielding layer 25 and gate lines 10 can be formed by the same reticle. Namely, the formation of the light-shielding layer 25 is performed by only changing the pattern of mask, without increasing the steps of process, so the formation of the light-shielding layer 25 does not almost increase the cost of the LCD panel.

Figure 2F:
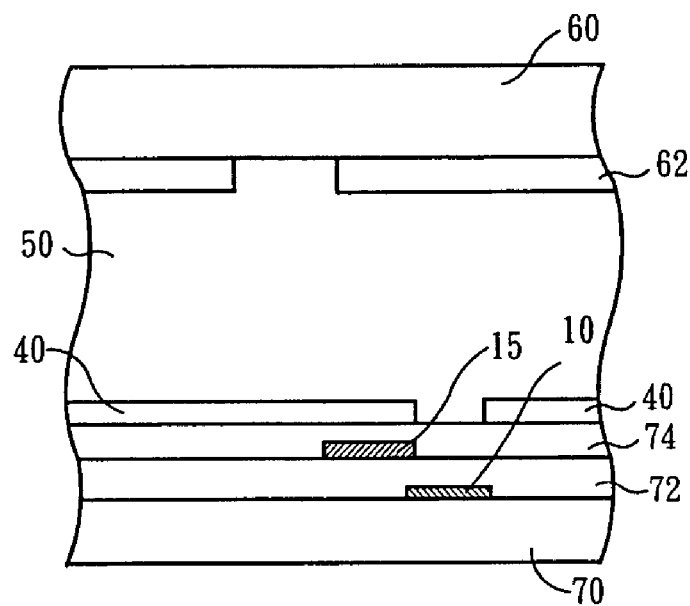
FIG. 2F is a cross-section diagram along a line 2F-2F' in FIG. 2D.

FIG. 2F is a cross-section diagram along a line 2F-2F' in FIG. 2D. Similarly, the LCD panel mainly comprises an upper substrate 60, an lower substrate 70 which is parallel to the upper substrate 60, a liquid crystal layer 50, a color filter layer 62, a plurality of gate lines 10, a plurality of pixel electrodes 40, a plurality of light-shielding layers 15, a insulating layer 72, a passivation layer 74, and a plurality of thin film transistors (not shown). The light-shielding layer 15 is formed on the sides of a corresponding gate line 10 and corresponding to the border with uncontinuous alignment of liquid crystal molecules for shielding the light leakage area 100 near the gate line 10. Furthermore, the light-shielding layer 15 partially overlaps the gate line 10 and can be formed after or before (i.e., above or below) the gate line 10. It is preferable that the light-shielding layer 15 is formed above the gate line 10, and thus the light-shielding layer 15 and the data lines 20 can be formed by the same reticle.

Figure 2G:
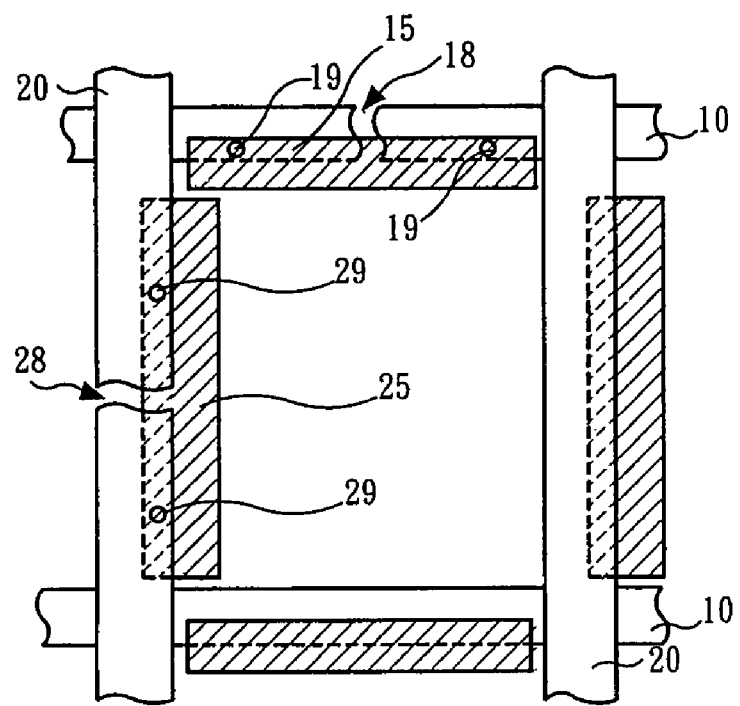
FIG. 2G is a schematic diagram of repairing broken lines in the LCD panel according to the present invention.

The light-shielding layers 15 and 25 not only has the function of shielding light, but also are employed to repair the broken data lines 20 and gate lines 10 or other electrical problems. As shown in FIG. 2G, the overlapping areas of the gate line 10/the light-shielding layer 15 and the data line 20/the light-shielding layer 25 respectively on two sides of the broken portions 18 and 28 of gate line 10 and data line 20 are irradiated by a laser beam. Thus the irradiated overlapping areas are melted to electrically connect to form one or more connecting points 19 and 29. The gate line 10 and the light-shielding layer 15 (and the data line 20 and the light-shielding layer 25) are electrically connected with each other trough these connecting points 19 (and connecting points 29). Signals on the gate lines 10 and the data lines 20 are transmitted by passing the light-shielding layers 15 and 25, so the light-shielding layers 15 and 25 have the function of repairing broken line.

Although specific embodiments have been illustrated and described, it will be obvious to those skilled in the art that various modifications may be made without departing from what is intended to be limited solely by the appended claims.

What is claimed is:

1. A TFT substrate of a LCD panel, said TFT substrate comprising:
    a substrate; and
    a plurality of pixel units on said substrate, each pixel unit comprising:
        four lines on four sides of said pixel unit, comprising a first gate line, a second gate line, a first data line, and a second data line, said first gate line and said second gate line on two opposite sides of said pixel unit and parallel to each other, and said first data line and said second data line on other two opposite sides of said pixel unit and perpendicular to said first gate line and said second gate line;
        a pixel electrode layer in said pixel unit and said pixel electrode layer overlapping at least one of said four lines;
        a thin film transistor in said pixel unit;
        a first light-shielding layer in said pixel unit and near a first side of four sides of said pixel unit, the first light-shielding layer being disposed over a border of the line on the first side and extending toward a center of four lines, said first light-shielding layer being formed together with the first data line or the second data line and parallel to the first gate line or the second gate line; and
        a second light-shielding layer in said pixel unit and near a second side of said pixel unit, the second light-shielding layer being disposed over a border of the line on the second side and extending toward the center of four lines, said second light-shielding layer being formed together with the first gate line or the second gate line and parallel to the first data line or the second data line.

2. The TFT substrate according to claim 1, wherein said LCD panel is driven by dot inversion.

3. The TFT substrate according to claim 2, wherein said first side is gone side corresponding to said overlapping portion, and said first light-shielding layer overlaps a line overlapped by said pixel electrode.

4. The TFT substrate according to claim 3, wherein said first light-shielding layer are electrically connected with said line via at least two connecting points.

5. The TFT substrate according to claim 4, wherein said connecting points are formed by laser irradiating.

6. The TFT substrate according to claim 2, wherein said second light-shielding layer is perpendicular to said first side and said first light-shielding layer, and said second light-shielding layer overlaps a line on said second side.

7. The TFT substrate according to claim 6, wherein said second light-shielding layer are electrically connected with said line via at least two connecting points.

8. The TFT substrate according to claim 7, wherein said connecting points are formed by laser irradiating.

9. The TFT substrate according to claim 6, wherein said first light-shielding layer and said line overlapped with second light-shielding layer are formed by the same reticle.

10. The TFT substrate according to claim 6, wherein said second light-shielding layer and said line overlapped with first light-shielding layer are formed by the same reticle.

* * * * *

UNITED STATES PATENT AND TRADEMARK OFFICE
CERTIFICATE OF CORRECTION

PATENT NO. : 8,049,829 B2  
APPLICATION NO. : 11/797703  
DATED : November 1, 2011  
INVENTOR(S) : Hung Meng Yi Page 1 of 1

It is certified that error appears in the above-identified patent and that said Letters Patent is hereby corrected as shown below:

Title Pg, Item (54)  
Title, please replace "Strucuture" with "Structure"

Column 1, line 1, please replace "Strucuture" with "Structure"

Signed and Sealed this  
Seventh Day of February, 2012

David J. Kappos  
*Director of the United States Patent and Trademark Office*